May 12, 1970     M. H. BURCKHARDT     3,511,061
SEALING SLEEVE MADE FROM ELASTIC MATERIAL ESPECIALLY FOR
DRIVING JOINTS IN MOTOR VEHICLES
Filed March 8, 1968

INVENTOR
MANFRED H. BURCKHARDT

BY *Craig & Antonelli*

ATTORNEYS

United States Patent Office 3,511,061
Patented May 12, 1970

---

3,511,061
SEALING SLEEVE MADE FROM ELASTIC MATERIAL ESPECIALLY FOR DRIVING JOINTS IN MOTOR VEHICLES
Manfred H. Burckhardt, Waiblingen, Germany, assignor to Daimler-Benz Aktiengesellschaft, Stuttgart-Unterturkheim, Germany
Filed Mar. 8, 1968, Ser. No. 711,752
Claims priority, application Germany, Mar. 9, 1967, D 52,480
Int. Cl. F16d *3/84*
U.S. Cl. 64—32                                     21 Claims

---

ABSTRACT OF THE DISCLOSURE

A sealing sleeve made from elastic material, particularly for drive joints in motor vehicles, in which a collar of smaller diameter serves for the securing at the shaft part and a collar of larger diameter for the securing at the joint part, and in which the body of the sleeve consists of at least two diaphragm parts which are connected with each other and with the collar parts by spacing sections; the diaphragm parts thereby extend essentially perpendicularly to the axis and their inclination to such perpendicular should not exceed 20°.

---

BACKGROUND OF THE INVENTION

Figure 1:
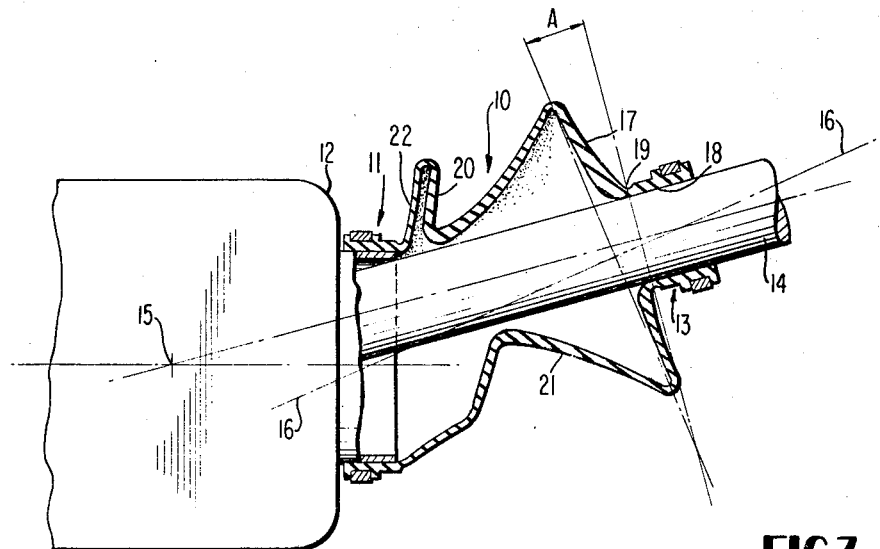

The present invention relates to a sealing sleeve made from elastic material, especially for drive joints in motor vehicles, having a collar with small diameter for securing at the shaft part and a collar of large diameter for securing at the joint part.

Sleeves of the aforementioned type have been utilized heretofore frequently in the motor vehicle construction. They have been used in particular with Cardan joints of also with joints of the driving half-shafts. Such types of sleeves have been constructed heretofore with a cross section of essentially undulated shape. However, the prior art sleeves have the disadvantage that they cannot absorb continuous loads, especially at higher rotational speeds. Instead, these prior art sieves frequently wear through or tear directly adjacent the clamping places at the collars. This has as a consequence that the grease filling of the joint can run out, which is not only an aesthetic defect but in its turn may raise again a question as to the life of the joint.

SUMMARY OF THE INVENTION

The present invention aims at avoiding the aforementioned disadvantages and to propose a sleeve which is able to absorb continuous loads also at higher rotational speeds. The underlying problems with the aforementioned type of sleeve are solved in accordance with the present invention in that the sleeve body consists of at least two diaphragm parts or sections extending essentially perpendicularly to the axis which are connected with each other and with the collar part by spacing sections or distance pieces.

The endurance failures occurring heretofore with known sleeves have their origin almost exclusively in that a deflection in the counter-direction, the so-called "counter deflection" occurs in the sleeves by reason of the axial distance of the clamping places thereof from the center point of the joint. The construction according to the present invention is now based on the consideration that one separate diaphragm part or section each is provided for the absorption of the deflection as well as also of the counter-deflection.

In principle, according to the present invention, the construction is feasible with several diaphragm parts or sections and spacing sections disposed therebetween. In one embodiment according to the present invention, a diaphragm portion associated with the small collar serves for the absorption of the counter-deflection and a diaphragm portion associated with the larger collar for the absorption of the deflection. In another embodiment of the present invention, two mutually adjacent diaphragm portions are associated with the small collar for the absorption of the counter-deflection whereas a diaphragm portion is arranged at the large collar for the absorption of the deflection.

A construction is preferred according to the present invention pursuant to which the diaphragm parts are inclined at most by about 20° with respect to a line perpendicular to the axis. Furthermore, it is advantageous if these diaphragm parts are comparatively yielding or elastic whereas the spacing pieces are constructed relatively rigid. Accordingly, it is also still within the frame of the present invention if the distance pieces or spacing sections are reinforced by rigid rings. These rings may be enclosed or embedded in a conventional manner in the elastic material.

The distance pieces or spacer sections are constructed according to the present invention trumpet-shaped. However, naturally, they may also be constructed conically or cylindrically. The latter is appropriate in particular when two diaphragm parts are disposed directly adjacent one another for the absorption of the counter-deflection. It is additionally proposed by the present invention that the spacing pieces and/or the diaphragm parts have a greater wall thickness inwardly than outwardly thereof.

The aforementioned endurance failures at the clamping places can be traced back, on the basis of exhaustive tests, to the fact that the normal deformation is prevented at these places. Accordingly, the present invention proposes that the collars are extended beyond the clamping places and pass over, possibly with a relief groove, into the adjacent diaphragm part or distance piece. In this manner, the stresses and strains may extend into the extension portions and may gradually decrease so that an overload does not occur at any place.

Accordingly, it is an object of the present invention to provide a sealing sleeve of elastic material, especially for drive joints in motor vehicles which avoids by simple and effective means the aforementioned drawbacks encountered with the prior art constructions.

Another object of the present invention resides in a sealing sleeve of the type described above which is able to endure continuous loads, particularly at higher rotational speeds.

A further object of the present invention resides in a sealing sleeve of elastic material, particularly for the drive joints in motor vehicles in which wear at the clamping places is minimized and therewith the life of the joint protected thereby is increased.

Figure 2:
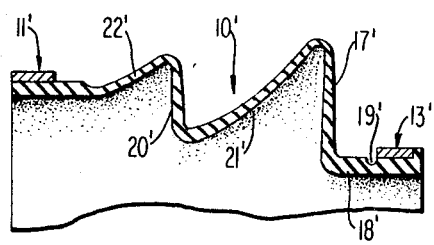
Figure 3:
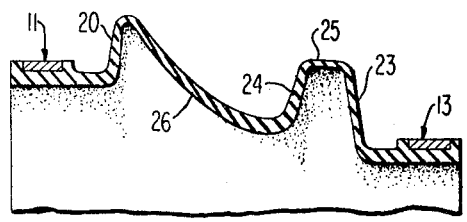
Figure 5:
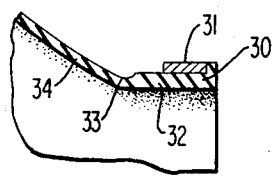
Figure 4:
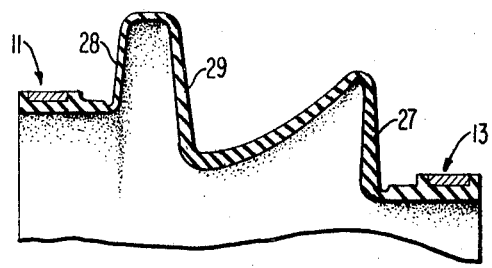
Figure 6:
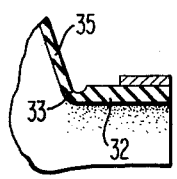

These and further objects, features, and advantages of the present invention will become more obvious from the following description when taken in connection with the accompanying drawing which shows, for purposes of illustration only, several embodiments in accordance with the present invention, and wherein:

FIG. 1 is a cross-sectional view through a first embodiment of a sealing sleeve in accordance with the present invention, arranged at a joint;

FIGS. 2, 3, and 4 are partial cross-sectional views through three further modified embodiments of sealing sleeves in accordance with the present invention; and FIGS. 5 and 6 are partial cross-sectional views of the clamping places of the sealing sleeves in accordance with the present invention.

Referring now to the drawing wherein like reference numerals are used throughout the various views to designate like parts, and more particularly to FIG. 1, the sleeve generally designated therein by reference numeral 10 is clamped at the joint outer part 12 by means of a collar generally designated by reference numeral 11 of large diameter. In the same manner, the sleeve 10 is secured at the shaft 14 by means of a collar generally designated by reference numeral 13 of small diameter. The fastening at both clamping places takes place by means of hose or pipe clamps in a conventional manner.

The deflection of the shaft 14 takes place about the joint center point 15 by a predetermined angle. However, since the clamping place 11 of the sleeve 10 is axially displaced by a predetermined amount with respect to the center point 15 of the joint, the sleeve 10 itself is deflected by a larger angle; namely, up to the axis 16. Consequently, a relative deformation of the sleeve 10 opposite the deflection of the shaft, the so-called "counter-deflection" about the angle A takes place in proximity to the clamping place 13 at the small diameter, so to speak of. This "counter-deflection" has lead heretofore to contact of the undulated diaphragm walls and was the cause for endurance failures.

According to FIG. 1, the sleeve 10 is provided in proximity of its clamping place 13 having a small diameter with a diaphragm part 17 which passes over by way of an extension piece 18 into the clamping piece. A relief groove 19 is additionally provided between the extension piece 18 and the diaphragm part 17. A gradual decrease of the stresses in the diaphragm is achieved thereby.

A further diaphragm part 20 is associated with the clamping place having a large diameter which serves for the absorption of the deflection. Whereas the first-mentioned diaphragm part 17 is arranged nearly completely perpendicularly to the axis, the diaphragm part 20 has a slight inclination with respect to a line perpendicular to the axis, which inclination can amount at most to 20°. Both diaphragm parts 17 and 20 are relatively elastic and have a greater wall thickness inwardly than outwardly. A distance piece or spacing section 21 is arranged between the two diaphragm parts 17 and 20 which is constructed of trumpet-like shape. Also, this distance or spacing section 21 is provided inwardly thereof with greater wall thickness than outwardly thereof. A similar distance piece or spacing section 22, in principle, of the same trumpet-shape construction is provided between the clamping piece 11 and the diaphragm part 20.

The sealing sleeve according to FIG. 2 is similar in construction to that discussed above except that the relief groove 19′ is provided between the extension piece 18′ and the clamping place.

According to FIG. 3, two diaphragm parts 23 and 24 are arranged in proximity to the clamping place 13 having the smaller diameter which both serve for the absorption of the counter-deflection and between which a relatively short cyclindrical distance piece or spacing section 25 is provided. The trumpet-shaped distance piece or spacing section 26 between the diaphragm part 24 and the diaphragm part 20, provided in principle in the same manner as in FIG. 2, extends now with opposite inclination, so to speak of. Also with this type of construction, corresponding extension pieces are provided between the clamping places and the adjacent diaphragm parts.

The reversal to FIG. 3 is illustrated, so to speak of, in FIG. 4. In the embodiment of FIG. 4, only one diaphragm part 27 serves for the absorption of the counter-deflection, whereas at the clamping place 11 with larger diameter, the two diaphragm parts 28 and 29 can absorb the deflection. As to the rest, the construction of FIG. 4 is in principle the same as in FIG. 3.

According to FIG. 5, the clamp 31 is mounted over the clamping piece 30. The extension piece 32 adjoins the clamping piece 30, whereby it is immaterial whether the clamp 31 is or is not disposed in a groove. A relief groove 33 is again provided between the extension piece 32 and the distance piece or spacing section 34.

FIG. 6 illustrates analogously the same construction. In this figure, a relief grove 33 is again arranged between the diaphragm part 35 and an extension piece 32.

While I have shown and described several embodiments in accordance with the present invention, it is understood that the same is not limited thereto but is susceptible fo numerous changes and modifications as known to a person skilled in the art, and I therefore do no wish to be limited to the details shown and described herein but intend to cover all such changes and modifications as are encompassed by the scope of the appended claims.

I claim:

1. A sealing sleeve having a body of elastic material, especially for drive joints in motor vehicles, and further having a first collar with smaller diameter for securing the sleeve at the shaft part and a second collar of larger diameter for securing the sleeve at the joint part, characterized in that the sealing sleeve body includes deflection means coordinated to each collar, and relatively large and rigid spacer means for connecting the deflection means with each other, wherein the deflection means coordinated to the first collar serves for the absorption of the counter-deflection and the deflection means coordinated to the second collar serves for the absorption of the deflection, wherein additional spacer means are provided between the deflection means and the collars, and wherein the collars are extended beyond the clamping places and extend over into the adjacent sleeve and have a relief groove thereon.

2. A sealing sleeve according to claim 1, wherein one of the deflection means consists of two diaphragm parts, the additional spacer means including a relatively short spacer means for connecting the two diaphragm parts, and the other deflection means consists of a single diaphragm part.

3. A sealing sleeve according to claim 2, wherein the diaphragm parts are inclined with respect to a line perpendicular to the axis by at most 20°.

4. A sealing sleeve according to claim 3, wherein the diaphragm parts are constructed of relatively resilient material.

5. A sealing sleeve according to claim 4, wherein the relatively large and rigid spacer means is of approximately trumpet-shape.

6. A sealing sleeve according to claim 5, wherein the spacer means and at least two diaphragm parts have a greater wall thickness inwardly than outwardly thereof.

7. A sealing sleeve having a body of elastic material, especially for drive joints in motor vehicles, and further having a first collar with smaller diameter for securing the sleeve at the shaft part and a second collar of larger diameter for securing the sleeve at the joint part, characterized in that the sealing sleeve body includes deflection means coordinated to each collar, and relatively large and rigid spacer means for connecting the deflection means with each other, wherein the deflection means coordinated to the first collar means serves for the absorption of the counter-deflection and the deflection means coordinated to the second collar serves for the absorption of the deflection, and wherein each of the deflection means consists of a single diaphragm part.

8. A sealing sleeve according to claim 7, wherein additional spacer means is provided between one of the collars and the deflection means coordinated therewith.

9. A sealing sleeve according to claim 8, wherein the collars are extended beyond the clamping places and extend over into the adjacent sleeve and have a relief groove thereon.

10. A sealing sleeve according to claim 7, wherein the diaphragm parts are inclined with respect to a line perpendicular to the axis by at most 20°.

11. A sealing sleeve according to claim 10, wherein additional spacer means is provided between the second collar and the deflection means coordinated therewith.

12. A sealing sleeve according to claim 11, wherein the collars are extended beyond the clamping places and extend over into the adjacent sleeve and have a relief groove thereon.

13. A sealing sleeve having a body of elastic material, especially for drive joints in motor vehicles, and further having a first collar with smaller diameter for securing the sleeve at the shaft part and a second collar of larger diameter for securing the sleeve at the joint part, characterized in that the sealing sleeve body includes deflection means coordinated to each collar, and relatively large and rigid spacer means for connecting the deflection means with each other, wherein the deflection means coordinated to the first collar serves for the absorption of the counter-deflection and the deflection means coordinated to the second collar serves for the absorption of the deflection, and wherein one of the deflection means consists of two diaphragm parts connected with each other by relatively short spacer means and the other deflection means consists of a single diaphragm part.

14. A sealing sleeve according to claim 13, wherein the diaphragm parts are inclined with respect to a line perpendicular to the axis by at most 20°.

15. A sealing sleeve having a body of elastic material, especially for drive joints in motor vehicles, and further having a first collar with smaller diameter for securing the sleeve at the shaft part and a second collar of larger diameter for securing the sleeve at the joint part, characterized in that the sealing sleeve body includes deflection means coordinated to each collar, and relatively large and rigid spacer means for connecting the deflection means with each other, wherein the deflection means coordinated to the first collar serves for the absorption of the counter-deflection and the deflection means coordinated to the second collar serves for the absorption of the deflection, and wherein the spacer means are of approximately trumpet-shape.

16. A sealing sleeve having a body of elastic material, especially for drive joints in motor vehicles, and further having a first collar with smaller diameter for securing the sleeve at the shaft part and a second collar of larger diameter for securing the sleeve at the joint part, characterized in that the sealing sleeve body includes deflection means coordinated to each collar, and relatively large and rigid spacer means for connecting the deflection means with each other, wherein the deflection means coordinated to the first collar serves for the absorption of the counter-deflection and the deflection means coordinated to the second collar serves for the absorption of the deflection, and wherein the spacer means and the deflection means have a greater wall thickness inwardly than outwardly thereof.

17. A sealing sleeve having a body of elastic material, especially for drive joints in motor vehicles, and further having a first collar with smaller diameter for securing the sleeve at the shaft part and a second collar of larger diameter for securing the sleeve at the joint part, characterized in that the sealing sleeve body includes deflection means coordinated to each other, and relatively large and rigid spacer means for connecting the deflection means with each other, wherein the deflection means coordinated to the first collar serves for the absorption of the counter-deflection and the deflection means coordinated to the second collar serves for the absorption of the deflection, the deflection means being formed of relatively resilient material, and wherein each of the deflection means consists of a single diaphragm part.

18. A sealing sleeve according to claim 17, wherein the spacer means are of approximately trumpet-shape.

19. A sealing sleeve according to claim 18, wherein the spacer means and the deflection means have a greater wall thickness inwardly than outwardly thereof.

20. A sealing sleeve according to claim 19, wherein the diaphragm parts are inclined with respect to a line perpendicular to the axis by at most 20°.

21. A sealing sleeve having a body of elastic material, especially for drive joints in motor vehicles, and further having a first collar with smaller diameter for securing the sleeve at the shaft part and a second collar of larger diameter for securing the sleeve at the joint part, characterized in that the sealing sleeve body includes deflection means coordinated to each collar, and relatively large and rigid spacer means for connecting the deflection means with each other, wherein the deflection means coordinated to the first collar serves for the absorption of the counter-deflection and the deflection means coordinated to the second collar serves for the absorption of the deflection, the deflection means being formed of relatively resilient material, and wherein one of the deflection means consists of two diaphragm parts connected with each other by relatively short spacer means and the other deflection means consists of a single diaphragm part.

References Cited

UNITED STATES PATENTS

| | | | |
|---|---|---|---|
| 2,672,740 | 3/1954 | Dunn | 64—32 |
| 2,755,643 | 7/1956 | Wildhaber | 64—32 |
| 2,857,975 | 10/1958 | Thorne | 64—8 X |
| 3,218,827 | 11/1965 | Aucktor | 64—8 |
| 3,313,319 | 4/1967 | Osborn et al. | 285—226 |

FOREIGN PATENTS 962,455　7/1964　Great Britain.

JAMES A. WONG, Primary Examiner

U.S. Cl. X.R.
277—212; 285—226